Jan. 3, 1967 M. B. NEUWORTH 3,296,316
DEALKYLATION OF BRANCHED-CHAIN P-ALKYLATED PHENOLS
Filed Nov. 27, 1961
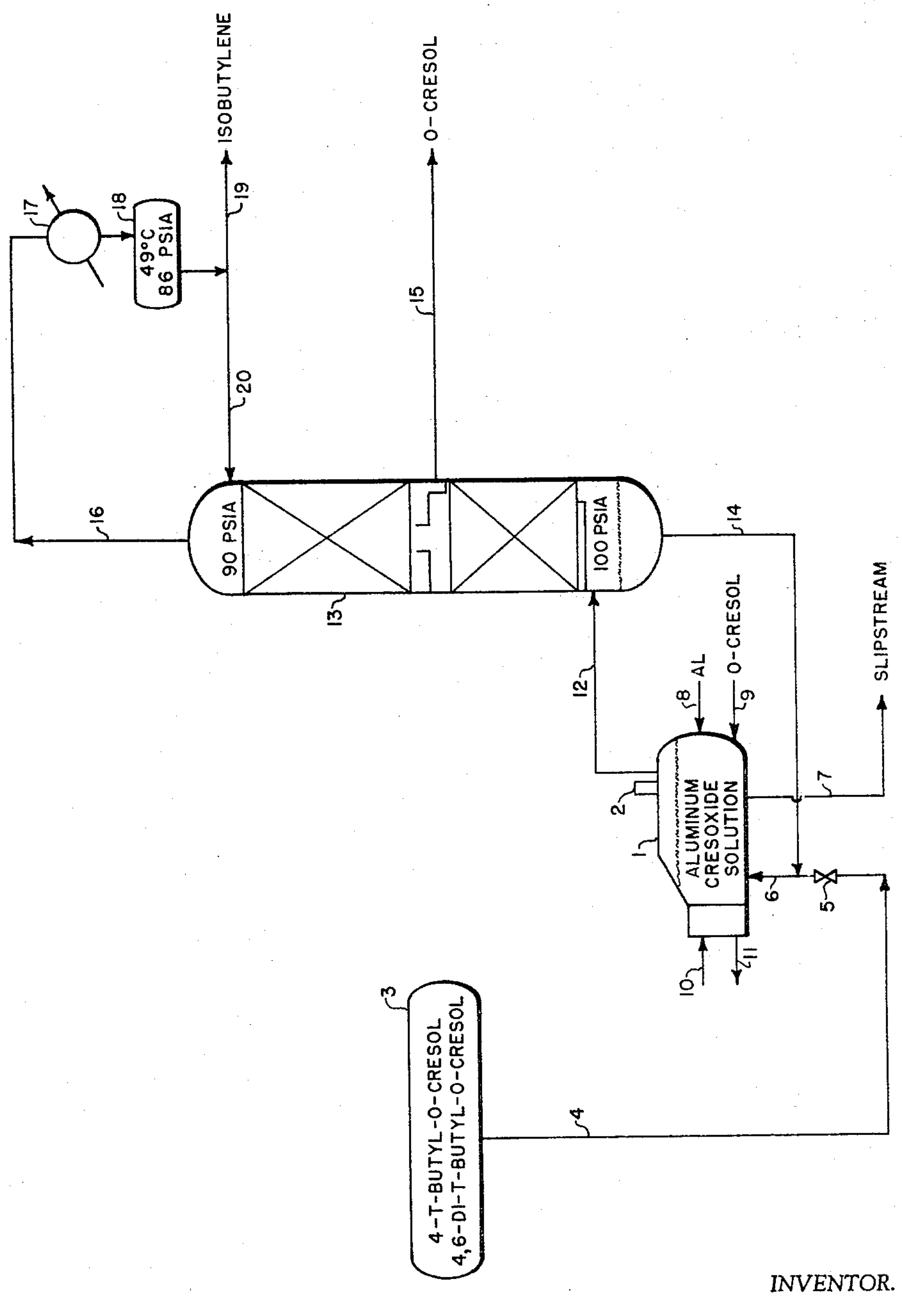
*INVENTOR.*
MARTIN B. NEUWORTH
BY *D. Leigh Fowler, Jr.*
ATTORNEY 3,296,316
Patented Jan. 3, 1967

3,296,316

DEALKYLATION OF BRANCHED-CHAIN p-ALKYLATED PHENOLS

Martin B. Neuworth, Pittsburgh, Pa., assignor to Consolidation Coal Company, Pittsburgh, Pa., a corporation of Pennsylvania Filed Nov. 27, 1961, Ser. No. 157,035
10 Claims. (Cl. 260—621)

This application is a continuation-in-part of my copending application Serial No. 801,650, filed March 24, 1959, and now abandoned.

This invention relates to a process for dealkylating a para-substituted branched-chain alkylphenol in the presence of a dealkylation catalyst. More particularly this invention relates to the dealkylation of a para-substituted branched-chain alkylphenol in the presence of a selective dealkylation catalyst comprising an aluminum phenoxide. Still more particularly, this invention relates to the debutylation of a mixture of 4-t-butyl-o-cresol and 4,6-di-t-butyl-o-cresol.

It is desirable or necessary in various chemical processes to effect dealkylation of alkylphenols. Thus in some alkylation processes where an ortho-alkylated product is sought, concomitantly formed para-alkylated product must be dealkylated in order for the over-all process to be of economic significance. While several catalysts are known for the deallkylation of alkylphenols, in actual plant practice it has been found that various objections exist to the use of many of these catalysts. Thus the sulfuric acid type catalysts produce extensive corrosion of the metal parts of apparatus in which such dealkylation is usually carried out, or require expensive equipment resistant to corrosion. Also, they cause oxidation and resinification of the phenolic compounds being alkylated. Various inorganic aluminum salts, such as the silicate, oxide and sulfide, have been suggested as dealkylation catalysts. They function essentially as cracking catalysts. Thus, not only is a lower phenol obtained during the dealkylation process, but further degradation to benzene also occurs. In addition, these dealkylation catalysts are unselective with respect to the alkyl group to be removed, stripping both the normal straight-chain and the branched-chain alkyl substituents. Also, many of the prior art catalysts proposed produce the desired lower phenols in relatively poor yield, reacting with only a portion of the alkylphenol. Or, frequently, excessive degradation of the alkylphenol occurs with a resulting production of undesired reaction products.

A. J. Kolka et al. ["The Ortho-Alkylation of Phenols," J. Org. Chem. 22, 642–646 (1957)] have reported a series of dealkylation experiments which were performed to determine the cause of the variation in product composition in their alkylation studies. They reported finding that 2-t-butylphenol was rapidly dealkylated at 190° C. in the presence of aluminum phenoxide, but 4-t-butylphenol failed to dealkylate even when refluxed with aluminum phenoxide at the boiling point of 4-t-butylphenol (236° C.). Apparently, ortho-substituted t-alkylphenols could be dealkylated, but para-substituted t-alkylphenols could not, although only these two particular butylphenols were investigated.

Accordingly, it is an object of the present invention to provide a method for dealkylating a para-substituted as well as an ortho-substituted branched-chain alkylphenol free from the objections heretofore present with prior art catalysts.

It is a further object to provide a method selective to the dealkylation of a para-substituted branched-chain alkylphenol compared with n-alkylphenols.

It is still a further object to provide a method for debutylating a para-substituted t-butylphenol in high yield.

It is still an additional object to provide a method for converting a mixture of 4-t-butyl-o-cresol and 4,6-di-t-butyl-o-cresol to o-cresol and isobutylene in at least 90 percent yield by weight.

This invention provides the first method heretofore available for debutylating the foregoing mixture and obtaining yields of 90 percent and higher.

In accordance with the process of this invention, a branched-chain alkylphenol that is nuclearly alkylated, with the branched alkyl group at least in the para position, is dealkylated in the substantial yield under dealkylating conditions in the presence of a dealkylation catalyst comprising an aluminum phenoxide. Surprisingly, despite the implications to be drawn from the contrary teaching of the prior art, we have found that this method is ideally suitable for completely dealkylating a para-substituted branched-chain alkylphenol. It is a preferred feature of this invention, in order to obtain substantial dealkylation of the para-substituted branched-chain alkylphenol, in yields of at least 50 percent by weight that the alkylphenol is reacted with from 0.3 to 10 percent by weight of aluminum for a period of at least 2 hours at a temperature between 150 and 400° C. at which gaseous olefin is formed, a dealkylated phenol and gaseous olefin being recovered from the reaction zone. Lower concentrations of catalyst and lower temperatures (above the minimum temperature at which a gaseous olefin is formed) require longer reaction times. Thus for optimum commercial yields, catalyst concentrations between 0.5 and 2 percent by weight coordinated with a reaction temperature between 200 and 300° C. and reaction times between 3 and 8 hours are preferred. While lower concentrations of catalyst may be used, even below 0.3 percent by weight, inordinately long reaction times, lacking in commercial interest, are required. Similarly, while reaction times of less than one or two hours may be used with elevated temperatures and higher catalyst concentrations, the yields obtained are generally of insufficient commercial interest.

The dealkylatable phenols of this invention comprise phenols having at least one para-substituted nuclearly attached branched-chain alkyl substituent. "Dealkylation," as used herein, means a splitting off of only a nuclearly attached branched-chain alkyl group from the nucleus. As used herein, the term "para-substituted branched-chain alkylphenol" refers to a nuclearly alkylated phenol where, in at least one alkyl group, a carbon atom thereof that is nuclearly attached to the para position on the ring is a secondary or tertiary carbon atom. This term is considered synonymous with the term "phenol containing a branched-chain alkyl group in the para position." Of course, when only one branched-chain nuclear alkyl substituent is present, this branched alkyl group can only be attached to the para position of the ring. Illustrative compounds include 4-isopropylphenol, 4-t-butylphenol, 4-sec-butylphenol, 4-t-butyl-o-cresol, 4-(1,1-dimethylbutyl)-o-cresol, 2,6-dimethyl-4-t-butylphenol, 2,5-dimethyl-4-t-butylphenol, 2-ethyl-4-t-butylphenol, 2-methyl-6-ethyl-4-t-butylphenol, 2,6-dimethyl-4-(1,1,3,3-tetramethylbutyl) phenol, and 4-sec-nonylphenol. A particularly preferred dealkylatable phenol for the practice of this invention is a mixture of 4-t-butyl-o-cresol and 4,6-di-t-butyl-o-cresol.

The dealkylation reaction occurs in the presence of an aluminum phenoxide catalyst, which must be present in the reaction system. The aluminum phenoxide may be preformed or formed in situ. In either event, sufficient aluminum must be added and a sufficient time allowed for the formation of the aluminum phenoxide catalyst actually to occur. Thus the presence of slight amounts of moisture may inhibit the reaction completely or reduce amount of aluminum phenoxide ultimately formed by the water present first reacting with the aluminum.

The dealkylation reaction is selective. For example, where at 1-butylcresol or t-butylxylenol is reacted in accordance with this invention, only the t-butyl group will be removed, the straight-chain lower alkyl groups remaining attached to the ring. At the same time the hydroxyl group of the phenol will not be affected. Many different classes of phenolic compounds may be dealkylated when treated in the presence of an aluminum phenoxide catalyst under dealkylating conditions to form a gaseous olefin. In addition to the more readily dealkylatable ortho-substituted branched-chain alkylphenols, such dealkylatable phenols have now been found to include hydroxy or polyhydroxy aromatic compounds of a monocyclic or polycyclic structure which contain at least one branched-chain alkyl substituent attached to the para position of the ring by the branched carbon atoms. Included are the para-substituted branched-chain alkylated phenols, naphthols, hydroxyanthracenes, and hydrophenanthrenes; alkylated ortho-, meta- and para-cresols, xylenols, and ethylphenols; cyclohexylphenols, benzylphenols, phenylphenols, and the like. The presence of other reactive groups in addition to the branched alkyl group will not ordinarily interfere with the process of this invention.

The dealkylation reaction may also be successfully employed to dealkylate phenols having more than one nuclearly attached branched-chain alkyl substituent, one of which is a branched p-alkyl group. Such compounds may be either partially dealkylated or completely stripped of their branched-chain alkyl groups. This controlled dealkylation may be readily accomplished inasmuch as the branched-chain ortho-substituted alkyl groups are more labile than the para-substituted ones and hence are essentially first to be dealkylated. Apparently, once these groups have been removed, the branched-chain para-substituted alkyl groups follow readily. Alkylphenols that may be partially or completely stripped of their branched-chain alkyls include 2,4-di-t-butylphenol, 4,6-di-t-butyl-o-cresol, 2-ethyl-4,6-di-t-butylphenol, 2,4,6-tri-t-butylphenol, 4,6-di-t-butyl-m-cresol, 2,4-dinonylphenol, 4,6-dinonyl-o-cresol, and 2,4-di-(1,1,3,3-tetramethylbutyl) phenol.

In commercial practice, this invention will find its preferred use in substantially debutylating, i.e., debutylating in yields greater than 50 percent by weight, a mixture of 4-t-butyly-o-cresol and 4,6-di-t-butyl-o-cresol. Under preferred debutylating conditions, using catalyst concentrations between 0.5 and 2 percent by weight coordinated with reaction times between 3 and 8 hours, hitherto-unobtained yields of debutylated product of at least 90 percent by weight of starting material are readily available.

The catalyst composition useful for the dealkylation of the para-substituted dealkylatable phenolic compounds of this invention may be either preformed or prepared in situ. The metallic aluminum used should preferably be oxide-free and moisture-free. The aluminum may be in the form of flakes, granules or turnings, relatively finely divided granules of 20–30 mesh particle size being preferred. While various methods may be used for preparing the preformed catalyst, a preferred method is to react either the phenol to be dealkylated or the expected dealkylated phenol directly with metallic aluminum at an elevated temperature and for a sufficient time to form the respective phenoxide. It is noted that the phenoxide of the alkylphenol to be dealkylated or of the resulting dealkylated phenol or of other alkylphenols, or phenol itself, may be preformed and used as catalyst. Where the phenoxide is formed in situ in the reaction vessel, then that of the phenol to be dealkylated is of course formed. A reaction temperature between 150 and 250° C. is generally suitable for the formation of the aluminum phenoxide. A temperature of about the boiling point of the phenol is preferred as the reaction proceeds more vigorously at this point. Depending upon the temperature used and the phenol being reacted, reaction times between 15 minutes and 4 hours are generally suitable. Inasmuch as hydrogen is given off during the formation of the phenoxide, the use of a preformed catalyst obviates the need for providing for venting for evolved hydrogen during the course of the reaction, as would be required where the catalyst is prepared in situ. This feature is advantageous where the reaction is carried out under pressure since greater partial pressures of the reactions can be obtained where no volume is taken up by evolved hydrogen. Furthermore, the use of a preformed catalyst allows for additional flexibility in that, as mentioned, an aluminum phenoxide may be used as catalyst that is not necessarily genetically derivable from the phenol being dealkylated.

The dealkylation reaction is carried out under dealkylating conditions which may vary from about substantially atmospheric pressure to a pressure of about 10 atmospheres, depending upon the rate of the dealkylation reaction desired. Pressures substantially in excess of 10 atmospheres ordinarily require too high a temperature for effective dealkylation without the occurrence of undesired side reactions. A temperature at which a gaseous olefin is formed is preferably between 150 and 400° C.

For debutylating mixtures of butylated cresols, a temperature between 200 and 300° C. is particularly preferred. For achieving substantially complete dealkylation, with respect to the nuclearly attached branched-chain alkyl groups, particularly where ortho-substituted in addition to para-substituted branched-chain alkyl groups are present, phenol should preferably remain in contact with the aluminum phenoxide for a period of time varying from at least 2 hours to from 4 to 8 hours. Longer reaction times may occasionally be required but are not generally of commercial interest. It will be readily appreciated that the higher the temperature employed the more rapid the dealkylation reaction. However, depending upon the specific dealkylatable phenol used, the upper temperature limit is restricted by pyrolytic side reactions that may occure as well as undesired oxidation and resinification reactions. In general, the debutylation reaction is effective in the presence of as little as 0.3 percent by weight of catalyst, based on aluminum content. For a typical batch process a weight of catalyst, based on aluminum content, of from 0.3 to 10 percent is suitable. Increasing the catalyst concentration also serves to increase the reaction rate and yield of dealkylated phenol. However, once a certain minimal concentration of catalyst has been exceeded, this effect is less marked than, for example, the effects of time and temperature. In order to avoid excessive consumption of the aluminum added to form the aluminum phenoxide catalyst, or of the preformed catalyst, the starting materials used should preferably contain less than 0.1 weight percent water. If a greater amount of water is initially present, it is preferred to dry the starting materials. One method that may be used for drying is by azeotropic distillation with a suitable liquid such as xylene. The granular aluminum may then be added to the dried material. Under preferred debutylation conditions, yields of at least 90 percent of debutylated phenol, based on weight of starting t-butylphenol are obtainable.

Other objects and features of this invention may be more fully understood from the following description taken in conjunction with the sole figure of the drawing which illustrates in a schematic manner an embodiment of this invention for the continuous debutylation of a mixture of 4-t-butyl-o-cresol and 4,6-di-t-butyl-o-cresol to o-cresol and isobutylene under pressurized conditions. These mixed butylated cresols are derived as the bottoms product from a primary fractionation of the butylated products of the butylation of o-cresol. Depending upon the reaction conditions used in the butylation of o-cresol, varying amounts of 6-t-butyl-o-cresol, 4-t-butyl-o-cresol, and 4,6-di-t-butyl-o-cresol are obtainable. Where 6-t-butyl-o-cresol is desired as the primary product, it is distilled off from the reaction mixture. The butylation by-products consist principally of 4-t-butyl-o-cresol and 4,6-di-tbutyl-o-cresol in a weight ratio of 1:3 respectively. These are then debutylated, thereby obtaining the starting o-cresol.

Referring to the drawing, a pressurized reaction vessel 1 is shown which contains aluminum cresoxide solution, preferably preformed by the direct reaction of aluminum with o-cresol at a temperature between 170 and 190° C. Hydrogen formed during the reaction may be vented through a vent 2. A distillation bottoms feed consisting of a mixture of 4-t-butyl-o-cresol and 4,6-di-t-butyl-o-cresol, contained in a vessel 3, is slowly fed through a conduit 4, a pressure control valve 5 and a conduct 6 to reaction vessel 1. The temperature of the reactants within vessel 1 is preferably maintained between 250 and 300° C. In order to insure completeness of reaction within vessel 1, the bottoms feed entering from conduit 6 is fed at a rate so that the aluminum cresoxide solution in vessel 1 is maintained in considerable excess compared with unreacted feed within vessel 1. Also a residence time of at least two hours for the reactants in vessel 1 is preferred in order to insure substantially complete debutylation. Spent aluminum cresoxide may be removed by way of a conduit 7 as a slipstream to subsequent acid hydrolysis, for rejection of resinified and oxidized products, and for recovery of the regenerated o-cresol. Make-up aluminum may be added to the vessel by means of a conduit 8. Similarly, additional o-cresol may be admitted by conduit 9. The vessel may conveniently be heated by circulation of a suitable heated fluid, such as Dowtherm, through a pair of conduits 10 and 11. The debutylation reaction that occurs is substantially completed in vessel 1 which is maintained at a pressure between 50 and 150 p.s.i.a., approximately 100 p.s.i.a. being preferred. The products formed, plus any unreacted materials, are fed from vessel 1 through a conduit 12 to a fractionation tower 13. The lower portion of the tower is maintained at approximately the same pressure as that prevailing within vessel 1. Any unreacted materials are removed from the bottom of tower 13 and recycled to vessel 1 by way of a conduit 14. The o-cresol is removed from fractionation tower 13 by way of a conduit 15. The isobutylene in the tower is in gaseous form inasmuch as it is above its critical temperature, namely, above 144° C. The isobutylene is removed from the top of tower 13, which is maintained at a slightly reduced pressure compared with the pressure in the lower portion of the tower, namely, 90 p.s.i.a., and fed through conduit 16 at a temperature of approximately 52° C. The isobutylene is passed to a cooling unit 17 and collected in vessel 18 at a temperature of 49° C. and a pressure of 86 p.s.i.a. The liqufied isobutylene is removed through a conduit 19. A portion of the isobutylene in vessel 18 may be recycled to tower 13 by way of a conduit 20 to maintain desired pressure within the top of tower 13. Thus by operating this continuous debutylation unit at an elevated pressure, the isobutylene is recovered as a liquid without any subsequent compression required. While an increase in pressure may slightly oppose the debutylation reaction, this is considered to be offset by the higher temperatures that may be employed, which considerably favor an increased rate of debutylation, and by the use of an excess of aluminum cresoxide in reaction vessel 1. It is of course understood that various appropriate automatic process controls, not shown, such as liquid level controls, feed rate controls, temperature and pressure controls and the like are to be employed with the continuous process illustrated.

While a continuous operation has been illustrated for the debutylation of a mixture of 4-t-butyl-o-cresol and 4,6-di-t-buty-o-cresol, a batch operation may equally well be employed. Where it is desired to carry out the process at atmospheric pressure, such batch techniques are generally preferable inasmuch as the use of relatively expensive automatic process instrumentation may be avoided. Where the dealkylation reaction is carried out under pressure, as illustrated, continual removal of the formed olefin gas is essential in order to insure favorable equilibrium and rate conditions for the reaction. At atmospheric pressure, at the temperatures employed, the gas is of course readily evolved and hence removed from the reaction zone.

The process of this invention is particularly advantageous and preferred over other processes in that the debutylation reaction is both selective and substantially complete under preferred dealkylation conditions so that yields in excess of 90 percent by weight are obtained. Thus, in a commercial process for preparing 6-t-butyl-o-cresol starting with o-cresol, a limiting factor in the commercial feasibility of the process is the recovery of the 6-t-butyl-o-cresol in high yield either by direct selective conversion of the o-cresol or by debutylation of undesired butylated o-cresols followed by recycling in the process. Thus, in a typical commercial process where o-cresol is reacted with isobutylene in the presence of a sulfuric acid catalyst, a conversion of o-cresol of at least 50 percent may be obtained. Of the converted o-cresol, 67.5 percent forms 6-t-butyl-o-cresol, 9.3 percent forms 4-t-butyl-o-cresol, and 22.1 percent forms 4,6-1-butyl-o-cresol. After the 6-t-butyl-o-cresol is removed from the mixture by distillation, the bottoms product consisting of 4-t-butyl-o-cresol and 4,6-di-t-butyl-o-cresol may be debutylated at a temperature between 200 and 300° C. at atmospheric pressure for a period of 6 to 8 hours in the presence of one percent aluminum cresoxide by weight, based on aluminum content, with recovery of o-cresol in excess of 90 percent of theory.

Similarly, a meta-para-cresol fraction obtained from the distillation of tar acids is extremely difficult to separate. In a process for preparing the known antioxidant 2,6-di-t-butyl-p-cresol, the m-p-cresol mixture is butylated and a mixture containing di-t-butyl-p-cresol and di-t-butyl-m-cresol recovered. The economic efficiency of such a process depends upon a satisfactory method of debutylating the t-butyl-m-cresol compounds formed, principally 4,6-di-t-butyl-m-cresol, inasmuch as such butylated m-cresol products are at present of limited commercial importance. The process of the present invention is particularly suitable for the debutylation of these butylated m-cresol compounds because of the high yields of debutylated products, namely, m-cresol and isobutylene, obtainable therewith.

The following examples illustrate the process of the invention but are not intended to unduly limit the generally broad scope of the present invention.

EXAMPLE 1

*Debutylation of p-t-butylphenol: 0.2% catalyst concentration; 15 hours debutylation time*

The catalyst was prepared separately by heating 12.0 g. phenol (Fisher A.C.S. grade, $<0.05\%$ $H_2O$) with 0.6 g. aluminum flakes (Alcoa #665) at 171° C. for two hours until hydrogen evolution had definitely ceased (0.056 cu. ft. $H_2$ at 735.2 mm. Hg, 72° F.). Then 291.8 g. (1.945 moles) p-t-butylphenol (Eastman, practical grade) was added to the cooled (30° C.) catalyst. The mixture was heated to 227° C. and refluxed through a ¾" x 3' distillation column containing stainless steel packing. At the 227° C. temperature and at 735.2 mm. Hg, debutylation commenced and continued at the rate of about 0.14 cu. ft. per hour for eight hours with a corresponding decrease in pot temperature to 208° C. as a result of the increasing concentration of lower-boiling phenol. The dropwise collection of distillate was started at this point to allow the pot temperature to rise to 239° C. In seven hours a total of 153.5 g. of distillate was collected (B.P. 175° C./735 mm. Hg). During the fifteen hours of total debutylation time, 1.482 cu. ft. of isobutylene was measured at 735–740 mm. Hg.

The distillation column was washed with toluene and this was added to the pot residue. The catalyst was hydrolyzed with 100 ml. of 6 N hydrochloric acid, and the toluene solution was then neutralized with sodium bicarbonate solution, dried and distilled.

An estimate of the yields, based on distillation data, was as follows:

| | Moles | Percent |
|---|---|---|
| Yield of phenol in distillate | 1.63 | 84 |
| Yield of phenol as aluminum salt and in column holdup | .07 | 3.5 |
| Total yield of phenol | 1.70 | 87.5 |
| p-t-Butylphenol as aluminum salt and residue | .24 | 12+ |
| Nonvolatile residue | | <0.5 |

EXAMPLE 2

*Debutylation of p-t-butylphenol: 1% catalyst concentration*

To a 500-ml. distillation pot connected to a ¾-inch by 2-foot packed column were charged 150 g. 4-t-butylphenol, 1.5 g. aluminum flakes (Alcoa NT 665) and 16 g. phenol. The mixture was heated at 208° C. for 25 minutes with consequent evolution of 0.074 cu. ft. of hydrogen gas measured at 735 mm. Hg, 72° F. The theoretical amount of hydrogen=0.076 cu. ft. After hydrogen evolution had substantially ceased, during the following 12 hours of reaction time the temperature was raised gradually from 208° C. to 240° C. with evolution of 0.700 cu. ft. of additional gas, or 78% of the theoretical isobutylene yield of 0.896 cu. ft. Initial evolution of isobutylene became evident at a temperature of about 210° C.

During the final 5¾ hours of debuylation, distillate totaling 80.3 g. was collected, consisting primarily of phenol (B.P. 177–180° C./725–730 mm. Hg). The reaction was terminated when gas was no longer evolved at the 240° C. pot temperature. The pot residue, consisting of aluminum salts of phenol and 4-t-butylphenol, was hydrolyzed with boiling dilute hydrochloric acid and then was benzene extracted. The extract was dried and distilled.

| Distillate: | G. |
|---|---|
| B.P.to 130° /20 mm. | 5.4 |
| B.P. 130–132°/20 mm. | 22.0 |
| Pot residue | 5.5 |
| Column holdup about | 10.0 |

The results of this experiment on the debutylation of 4-t-butylphenol are tabulated below:

| | Mole | Yield, Percent |
|---|---|---|
| Feed: | | |
| 150 g. 4-t-butylphenol | 1.00 | |
| 16 g. phenol | 0.17 | |
| Products: | | |
| Isobutylene | 0.78 | 78 |
| Phenol: | | |
| Distillate | 0.855 | |
| Salt | 0.058 | |
| Total | 0.913 | |
| Charged | 0.17 | |
| From debutylation | 0.74 | 74 |
| 4-t-butylphenol (from aluminum salt): | | |
| Overhead | 0.15 | |
| Column holdup | 0.07 | |
| | 0.22 | 22 |
| Nonrecoverable residue | | 4 |

EXAMPLE 3

*Debutylation of 4-t-butyl-o-cresol*

The feedstock for this run was 328 g. (2.0 moles) of dry 4-t-butyl-o-cresol and 2.0 g. of 20–30 mesh aluminum. These were heated to 230° C. before gas evolution began. As debutylation proceeded the pot temperature dropped to 204° C. in 6 hours because of the increasing concentration of the lower boiling o-cresol. During this time about 70% of the theoretical amount of isobutylene was evolved as measured by a wet test meter. Atmospheric distillation of the o-cresol on a ¾-inch Vigreux column was started at this point with no attempt to measure further evolution of isobutylene. The non-volatile pot residue was hydrolyzed to destroy the aluminum salt and was then distilled at 0.3 mm. Hg pressure to remove the liberated phenols and determine the degree of resinification. The results of this experiment are tabulated as follows:

Feed:
- 2.00 moles 4-t-butyl-o-cresol

Distillate:
- 1.68 moles o-cresol
- 0.15 mole 4-t-butyl-o-cresol

Pot residue:
- 0.12 mole 4-t-butyl-o-cresol (as aluminum salt)
- 0.05 mole resinous material
- Conversion of 4-t-butyl-o-cresol: 86.5% (per pass)
- Yield of o-cresol: 97.0% (based on recycle of 4-t-butyl-o-cresol to extinction)

EXAMPLE 4

*Debutylation of mixture of 4-t- and 4,6-di-t-butyl-o-cresol*

The butylation by-products 4-t-butyl-o-cresol and 4,6-di-butyl-o-cresol were obtained in a weight ratio of about 1:3 respectively. The mixture was combined with xylene and dried azeotropically. The dried solution had the following composition:

| | |
|---|---|
| Xylene | 32.1 g. |
| 6-t-butyl-o-cresol | 1.8 g. (0.011 mole). |
| 4-t-butyl-o-cresol | 70.5 g. (0.430 mole). |
| 4,6-di-t-butyl-o-cresol | 203.5 g. (0.925 mole). |

To this was added 3.0 g. of 20–30 mesh aluminum (Fisher, A–547). Debutylation was carried out using a ¾-inch x 3-foot packed column as a demister and fractionator. Gas evolution began at a pot temperature of 224° C. After 3¼ hours at 224–235° C., the temperature rose to 300° C., and an additional 0.33 cu. ft. of gas was measured for a total of 2.03 cu. ft. During isobutylene removal, o-cresol was removed at a reflux ratio of 8:1 and a head temperature of 175–180° C. to yield a total of 141.2 g. of distillate, which analyzed as follows:

| | |
|---|---|
| Isobutylene | 4.7 g. (0.084 mole). |
| Xylene | 21.0 g. |
| o-Cresol | 111.6 g. (1.030 moles). |
| Phenol | 0.6 g. (0.006 mole). |

The 45.8 g. of residue was retained to catalyze debutylation of a second charge which, after azeotropic drying, had the following composition:

| | |
|---|---|
| o-Cresol | 3.8 g. (0.035 mole). |
| Xylene | 44.2 g. |
| 6-t-butyl-o-cresol | 1.0 g. (0.006 mole). |
| 4-t-butyl-o-cresol | 70.0 g. (0.425 mole). |
| 4,6-di-t-butyl-o-cresol | 201.5 g. (0.915 mole). |

This batch was also debutylated on the ¾-inch x 3-foot packed column at a pressure of 740 mm. Hg. Gas evolution began at a pot temperature of 195° C. and continued at 195–200° C. for 18 minutes to yield 0.70 cu. ft. of gas, measured at 85° F. Debutylation continued at 225–244° C. for an additional 5 hours to yield a total of 1.8 cu. ft of gas, and for a final 50 minutes at 244–320° C. to yield a total of 2.018 cu. ft. During the 6 hours 8 minutes total reaction time, o-cresol was removed at an 8:1 reflux ratio and a head temperature of 170–180° C. for a distillate yield of 191.4 g. analyzing as follows:

| | |
|---|---|
| Isobutylene | 6.2 g. (0.110 mole). |
| Xylene | 33.2 g. |
| o-Cresol | 149.0 g. (1.380 moles). |
| Phenol | 3.0 g. (0.032 mole). |

The 48.3 g. of pot residue was hydrolyzed with dilute hydrochloric acid, neutralized, dried and distilled. The composition of this hydrolyzate was as follows:

| | |
|---|---|
| o-Cresol | 16.6 g. (0.154 mole). |
| 4-t-butyl-o-cresol | 7.4 g. (0.045 mole). |
| 4,6-di-t-butyl-o-cresol | 18.7 g. (0.040 mole). |
| 4-t-butylphenol | 3.3 g. (0.022 mole). |
| Aluminum | 3.0 g. |
| Loss, resinous material | 9.3 g. |

The yield and material balance on the two runs combined is tabulated below:

| | Moles |
|---|---|
| Butylated material fed | 2.712 |
| Butylated material consumed | 2.605 |
| o-Cresol in distillate | 2.410 |
| o-Cresol as aluminum salt | 0.154 |
| | 2.564 |
| o-Cresol in feed | 0.035 |
| Yield of o-cresol from debutylation | 2.529=97% [1]. |
| Yield of phenol from debutylation | 0.038=1.5% [1]. |
| | 2.567 |
| Total gas through wet test meter | 4.53 |
| Hydrogen from salt formation | 0.17 |
| Isobutylene gas | 4.36 |
| Isobutylene disolved in distillate | 0.19 |
| Total isobutylene recovered | 4.55 |
| Theoretical isobutylene recovery | 4.40 |

Yield of isobutylene, 103%.

[1] Yields based on butylated material consumed.

EXAMPLE 5

*Debutylation of 4,6-di-t-butyl-m-cresol with aluminum -m-cresoxide catalyst*

To prepare the catalyst, 52.9 g. of m-cresol was heated with 2.2 g. of Alcoa aluminum flake. At 156° C., hydrogen evolution began with spontaneous rise in temperature to 195° C. in 3 minutes. The vigorous evolution of hydrogen continued for 4–5 minutes and then ceased. Total volume of gas by wet test meter measurement was 0.132 cu. ft. @ 735.0 mm. Hg, 23° C. The catalyst was protected from moisture with a drying tube while cooling to room temperature.

Then 220.3 g. (1 mole) of 4,6-di-t-butyl-m-cresol (molten) was poured into the flask and the whole was set up on a ½" x 2' packed column and heated. Vigorous debutylation began at 179° C. and continued for 1½ hours to a pot temperature of 210° C. Total volume of isobutylene liberated was 1.725 cu. ft. as measured by wet test meter at 735.0 mm. Hg, 23° C. Theoretical volume=1.78 cu. ft.; yield of gaseous isobutylene=97%. During the final 15 minutes the head temperature rose from 67° C. to 190° C. Most of the free m-cresol was removed overhead, the last traces being distilled at 30 mm. Hg with an aspirator pump. The total weight of distillate was 120.4 g. The pot residue weighed 34.7 g. This was hydrolyzed with 100 ml. dil. HCl, neutralized, dried, and distilled. One fraction of distillate was collected (B.P. mostly 98° C./20 mm. Hg) weighing 35 g. and containing some solvent. The residue weighed 5 g. From the distillation data, the following results were calculated:

Conversion: 100%
Isobutylene: 97% recovery as gas
m-Cresol: 75% overhead
22% as aluminum salt
3% resinous pot residue

EXAMPLE 6

*Dealkylation of 4,6-dinonyl-o-cresol*

Approximately stoichiometric amounts of o-cresol and nonene were reacted at a temperature between 70 and 80° C. at atmospheric pressure in the presence of boron trifluoride as catalyst (2–3 percent based on weight of o-cresol). The nonene used is a liquid trimer of propylene consisting essentially of a mixture of nonenes having branched-chain nonyl groups. From the reaction mixture were recovered 4-nonyl-o-cresol and 4,6-dinonyl-o-cresol. These were separated by distilling off the lower-boiling 4-nonyl-o-cresol. The distillation residue consisting of 4,6-dinonyl-o-cresol was then dealkylated as follows:

Dinonyl-o-cresol (200–220° C./10 mm.), (0.725 mole) 261.4 g., and Alcoa aluminum powder, (0.133 mole) 3.6 g., were heated to a pot temperature of 337° C. before evolution of gas began. Shortly thereafter, liquid reflux began in the head, and the head temperature rose to 136–139° C. The pot temperature gradually dropped to 270–273° C. Distillate was removed at a reflux ratio of 8:1 for 3 hours until refluxing stopped. A total of 158.2 g. material was collected at 136–139° C./738 mm. Hg. Another 34.4 g. (presumably o-cresol) was removed at 142° C./738 mm. to 103° C./13 mm. The pot residue weighed 64.9 g. This was hydrolyzed with hydrochloric acid, neutralized, and distilled.

From the distillation data the following results were calculated:

| o-Cresol: | Nonenes |
|---|---|
| 44% as distillate | 86.5% as distillate. |
| 30% as aluminum salt | |
| 15% as monononyl cresol | 7.5% as mononony cresol. |
| 3.5% as dinonyl cresol | 3.5% as dinonyl cresol. |
| 7.5% loss + resinous pot residue | 2.5% loss. |

It will of course be realized that many varied conditions may be employed for the practice of this invention depending upon the particular para-substituted branched-chain alkylphenol used as starting material, the reaction temperature and pressure employed, catalyst concentration and the like. It is, however, considered essential that aluminum phenoxide be formed and present during the dealkylation reaction. Also, either batch or continuous processing with the usual provision for recycle of various unreacted or partially reacted mixture components may be employed. The scope of this invention is not therefore to be limited except in accordance with the objects and claims thereof.

I claim:

1. A process for dealkylating a dealkylatable monobasic phenol containing a branched-chain alkyl group in the para position and otherwise unsubstituted on the nucleus by other than alkyl groups, said phenol being selected from the group consisting of p-nonylated phenol, p-t-butylated metacresol, 2,6-di-t-butyl-p-cresol, 4-t-butyl-o-cresol, 4,6-di-t-butyl-o-cresol, and a mixture of 4-t-butyl-o-cresol and 4,6-di-t-butyl-o-cresol, which comprises heating a mixture of said phenol and from 0.3 to 10 percent by weight, based on aluminum content, of an aluminum phenoxide for at least 2 hours at a temperature between 150 and 400° C. at which a gaseous olefin is formed, and recovering from the reaction mixture the phenol stripped of said branched-chain alkyl group in the para position.

2. A process for dealkylating a monobasic phenol containing a tertiary alkyl group in the para-position and an alkyl group in at least one of the other positions on the phenol nucleus, said phenol nucleus being unsubstituted by other than alkyl groups, which comprises heating said phenol in the presence of a catalytic amount of an aluminum phenoxide at a temperature between 150 and 400° C. until an olefin is formed, and recovering from the reaction mixture the phenol stripped of at least said tertiary alkyl group in the para-position.

3. A process according to claim 2 wherein the tertiary alkyl group is a tertiary butyl group.

4. In a recycle process for the butylation of o-cresol to prepare 6-t-butyl-o-cresol in substantial yield wherein isobutylene is reacted with o-cresol in the presence of a butylation catalyst to form an initial mixture of 6-t-butyl-o-cresol, 4-t-butyl-o-cresol and 4,6-di-t-butyl-o-cresol in substantial yield, the steps of separately recovering said 6-t-butyl-o-cresol and separately recovering a p-butylated mixture of said 4-t-butyl-o-cresol and 4,6-di-t-butyl-o-cresol from the initial mixture, heating the p-butylated mixture for at least 2 hours at a temperature between 150 and 400° C. with 0.3 to 10 percent by weight, based on aluminimum content, of an aluminum phenoxide as debutylation catalyst to form o-cresol and isobutylene, recovering the o-cresol and isobutylene formed, and recycling at least a portion of the recovered o-cresol and isobutylene in the butylation process to form additional initial mixture.

5. A method of making m-cresol by dealkylating a p-t-alkylated m-cresol selected from the class consisting of 4-t-alkyl-m-cresol, 4,6-di-t-alkyl-m-cresol, and a mixture of 4-t-alkyl-m-cresol and 4,6-di-t-alkyl-m-cresol, which comprises heating said p-t-alkylated m-cresol in the presence of a catalytic amount of an aluminum phenoxide at a temperature between 150 and 400° C. until olefin is formed, and recovering m-cresol from the reaction mixture.

6. A method of making m-cresol comprising heating 4,6-di-t-butyl-m-cresol with 0.3 to 10 percent by weight, based on aluminum content, of aluminum m-cresoxide for at least two hours at a temperature between 150 and 400° C. at which a gaseous olefin is formed, and recovering m-cresol and isobutylene from the reaction mixture.

7. A process for converting a mixture of 4-t-butyl-o-cresol and 4,6-di-t-butyl-o-cresol to o-cresol and isobutylene in at least 90 percent yield by weight which comprises adding to said mixture an amount of substantially oxide-free finely divided aluminum, sufficient to form 0.3 to 10 percent by weight, based on aluminum content, of an aluminum o-cresoxide, heating said mixture at a temperature between 200 and 300° C. for a period of time between 4 and 8 hours to form o-cresol and isobutylene in at least 90 percent yield by weight, and recovering the o-cresol and isobutylene from the mixture in a yield of at least 90 percent by weight.

8. A method of making m-cresol comprising heating a 4,6-di-t-alkyl-m-cresol at a temperature of 150–400° C., in the presence of a catalytic amount of an aluminum aryloxide selected from the group consisting of phenoxide and lower alkyl phenoxide, until about two moles of isoolefin per mole of 4,6-di-t-alkyl-m-cresol are evolved, and recovering m-cresol from the reaction mixture.

9. A method of making m-cresol comprising heating 4,6-di-t-butyl-m-cresol at a temperature of 150–400° C. in the presence of a catalytic amount of aluminum m-toloxide, until about 2 moles of isobutylene per mole of 4,6-di-t-butyl-m-cresol are evolved, and recovering m-cresol from the reaction mixture by distillation.

10. Method according to claim 9 wherein the reaction temperature is 200–300° C.

References Cited by the Examiner

UNITED STATES PATENTS

| | | | |
|---|---|---|---|
| 2,206,924 | 7/1940 | Stevens et al. | 260—621 |
| 2,425,858 | 8/1947 | Beach | 260—621 X |
| 2,831,898 | 4/1958 | Ecke et al. | 260—624 |
| 2,836,627 | 5/1958 | Neuworth et al. | 260—624 |
| 2,923,745 | 2/1960 | Buls et al. | 260—624 |
| 3,091,646 | 5/1963 | Leston | 260—621 |

FOREIGN PATENTS 176,557 9/1961 Sweden.

OTHER REFERENCES

Kolka et al.: J. Organic Chem., 22:646, 1957, 1 page.

LEON ZITVER, *Primary Examiner.*

CHARLES B. PARKER, *Examiner.*

H. G. MOORE, D. M. HELFER, *Assistant Examiners.*